Patented Dec. 13, 1938

2,140,263

UNITED STATES PATENT OFFICE 2,140,263

METHOD FOR THE PURIFICATION OF PETROLEUM MAHOGANY SULPHONATES

George Andreas Kessler and Manuel Blumer, Butler, Pa., assignors to L. Sonneborn Sons, Inc., a corporation of Delaware No Drawing. Application October 6, 1936,
Serial No. 104,181

15 Claims. (Cl. 260—159)

This invention relates to a new and useful method for the purification of petroleum mahogany sulphonates.

The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water-soluble, imparting to their aqueous solution a dark-green color, and being for this reason generally referred to as "green petroleum sulphonic acids". The acids left in solution in the oil impart a reddish color to the oil and for this reason are generally referred to as "mahogany petroleum sulphonic acids". After the separation of the oil from the acid sludge the mahogany sulphonic acids are removed from the oil either directly as such in accordance with the method described in the Liberthson Patent 2,050,345 (Aug. 11, 1936) or by the ordinary refining method comprising conversion of the acids into salts by direct neutralization of the acid treated oil followed by suitable extraction. The acid salts or mahogany sulphonates constitute a valuable by-product of petroleum refining, being used for a variety of purposes but primarily as emulsifying agents.

The mahogany sulphonic acids or mahogany sulphonates constitute a material well defined in its character and properties though as yet unknown in its composition. It is assumed to comprise a series of closely related sulphonic acids or sulphonates as the case may be with a varying number of sulfo groups. Inasmuch, however, as the material obtained in the refining of petroleum oils is substantially uniform and well identifiable, we have termed and will refer to the neutralized sulphonic acids for the purpose of brevity simply as "mahogany sulphonate" or "mahogany sulphonates".

One object of our invention comprises inter alia the removal of inorganic matter from crude mahogany sulphonates. It is likewise applicable to the removal of such matter from any mahogany sulphonate stock or mahogany sulphonate containing composition that is from any material which comprises as its essential ingredient petroleum mahogany sulphonates in conjunction with other substances or diluents, notably lubricating oils retained by the mahogany sulphonates after their recovery from an acid treated oil in the manner well known in the art.

The crude mahogany sulphonates, as they are derived from an acid treated oil, contain varying amounts of inorganic salts, notably sulphates and sulphites, and it is in many cases not only desirable but even requisite to substantially remove these admixed inorganic salts.

We have discovered that mahogany sulphonates can be obtained in a substantially pure condition by the use of certain organic solvents capable of extracting the mahogany sulphonates. The solvents that are suitable in accordance with the invention must be such as will not dissolve inorganic salts; they must be substantially water immiscible but preferably capable of absorbing limited amounts of moisture and should be liquid at normal temperatures. Suitable solvents are for instance benzol, gasoline, carbon tetrachloride, ethylene chloride and in general all aliphatic and aromatic hydrocarbons and ethers as well as their derivatives. The boiling range of the solvents that may be used in our new method must be sufficiently low to permit their removal in the customary manner such as by distillation in vacuo or otherwise without causing thereby a partial decomposition of the mahogany sulphonates. It is of advantage that the boiling points be so low and preferably between 35° and 150° C. as to enable the removal of the solvent at ordinary temperatures without the necessity of resorting to vacuum distillation. In the practical application of our method the crude mahogany sulphonates are contacted with the solvent as thoroughly as possible and if necessary with the aid of agitation. After the removal of solid matter from the solution by settling or filtering or centrifuging, the solvent is flashed off and the mahogany sulphonates are obtained as such substantially pure, that is substantially free from inorganic salts in excess of 3% which in most cases is sufficiently pure for commercial purposes.

As a further embodiment of our invention we have found that it is possible to obtain a product of an inorganic salt content below 1% and to even substantially entirely eliminate any inorganic salts by observing certain additional limitations with regard to the solvent. It is requisite that the same contain a certain moisture content which is critical within certain limits for the successful operation of this method and best results are obtained if the moisture content is substantially maintained between 3 and 8%. Care should be taken that there is no substantial deviation from these limits either way. If the moisture content of the solution of the mahogany sulphonate in the particular solvent used is appreciably below 3% it is extremely difficult and on a commercial scale practically impossible to achieve the substantial elimination of the inorganic salts, as up to 2% or more are taken up by the solvent from the crude salt in colloidally dispersed form and cannot be removed either by settling, filtering or even centrifuging. Should the moisture content in the solution be appreciably in excess of 8%, more than 1% and up to several percent of inorganic salt will be found in true solution in the solvent due to the excessive water content and though the solution readily settles clear and can be filtered or centrifuged free of suspended solids the sulphonate obtained from such clarified solutions possesses an inorganic salt content of 2 to 3% and higher. If, however, the moisture content of the solution is substantially maintained between 3 and 8% and preferably between 3 and 5%, a clear solution of the mahogany sulphonate substantially free from dissolved or dispersed inorganic salt is obtained. Depending on the care exercised during the separation of the mahogany sulphonate solution from the undissolved solid matter the final product obtained after the removal of the solvent is either substantially entirely free from inorganic salts or will contain insignificant amounts of less than 1%. If the mahogany sulphonate solution, for instance, is permitted to settle overnight and then centrifuged the purified sulphonate recovered from the solution is substantially entirely free from any inorganic salt content. If, on the other hand, the solvent extraction and separation from solid matter is conducted within a relatively short period of time and by filtration a slight amount of inorganic salts but not exceeding 1% will be present in the final product.

In most cases a mahogany sulphonate is considered sufficiently pure if the inorganic salt content is below 3% though preferably below 1%. Although it is possible to eliminate the inorganic salts substantially entirely from the mahogany sulphonates by our method it is in many instances impractical and uneconomical to do so particularly when operating on a large scale and therefore wherever a comparatively high degree of purity is desired we prefer a purification yielding a substantially pure mahogany sulphonate containing some but less than 1% of inorganic salts.

In connection with the purification of the mahogany sulphonate to a salt content not exceeding 1% we have further discovered that it is of importance to control the pH of the solution of the mahogany sulphonate in the particular solvent. We have found that if the pH appreciably exceeds 7.0 (being on the alkaline side), it is highly difficult and in large scale operations practically impossible to obtain a product substantially free from inorganic salts even though the moisture content in the solution was maintained between 3 and 8%, whereas a pH of 7 or below 7.0 and above 3 (being on the acid side), yields a substantially pure end product. This becomes of particular importance with regard to the extent of neutralization with a suitable acid to which a mahogany sulphonate solution must be subjected for the successful purification below 1% salt content should it possess too high a degree of alkalinity due to the free alkali normally present in the crude sulphonate. Thus, for instance, a neutralization with phenolphthalein as indicator will show a neutral point at a pH of approximately 7.5 to 8 and sometimes even as high as 9 which is in excess of the successful operating pH value of this method and a solution neutralized to the phenolphthalein end point and clarified by settling, filtering or even centrifuging will produce a mahogany sulphonate showing in excess of 2% inorganic salt content. Where, however, methyl orange is used as indicator the end point of the neutralization appears at a pH of approximately 3 to 4 and the final product obtained after the clarification of the solution is substantially free from inorganic salts.

A further advantage of the control of the pH within the indicated limits resides in the fact that the speed with which the inorganic salts will settle out or can be removed by filtration from the solution of the mahogany sulphonates is considerably higher than that at higher pH ranges. So, for instance, the speed of settling of a solution neutralized to the methyl orange end point is about 5 times that of the phenolphthalein end point solution and the rate of filtration of the methyl orange end point solution is approximately 10 times that of the phenolphthalein end point solution.

The concentration of the mahogany sulphonate in the solution is not critical though care should be taken that the solution is still sufficiently fluid to permit effective settling or filtering. In most cases concentrations of from 20 to 50% of mahogany sulphonate in the solution of the organic solvent operate successfully though higher concentrations may be used where the nature and character of the solvent will permit. We preferably employ, however, a 35 to 40% solution.

Though our method is generally applicable to the purification of crude mahogany sulphonates admixed with inorganic salts regardless of whether they have undergone preliminary refining or purification steps we preferably apply our method to the purification of the crude mahogany sulphonate stock customarily obtained in the acid treatment of petroleum distillates and containing varying amounts of oil and inorganic salts. The oil content of such crude stock is usually up to 36% or more while the inorganic salts are as a rule present in amounts of approximately 9% and higher. This crude mahogany sulphonate containing material is in most cases strongly alkaline. In order to procure the most favorable operating conditions for our method the same is neutralized with a suitable acid such as sulphuric acid or hydrochloric acid to the methyl orange end point either before or after the addition of the solvent but preferably after such addition. The solvent extraction of the mahogany sulphonate (20 to 50% solution) under the afore-described conditions, i. e. 3 to 5% and preferably 4% moisture content and a pH of less than 7.0, and preferably 3.5 to 4, is followed by the separation of the solution from solid matter and/or centrifuging if necessary and the subsequent removal of the solvent in the conventional manner. For practical and economical reasons we preferably employ benzol or gasoline as the solvent for the extraction. The end product obtained in this manner is composed of mahogany sulphonate and originally present oil but is substantially free from inorganic salts. If desired, the oil may be removed by a further suitable extraction or separation procedure such as for instance by the well known Spitz-Höning method.

Wherever we use the terms "mahogany sulphonate" or "mahogany sulphonates" in connection with the removal of inorganic matter in the specification and claims, we mean to include not only the neutralized material as such as obtained by the sulphonation of lubricating oil stock as afore-described but also such material compounded or admixed with other substances or diluents of the hereinbefore described character and nature.

The foregoing description is by way of illustration and not of limitation, and we are not to be limited to any details but only by the appended claims in which we have endeavored to claim broadly all inherent novelty.

We claim:

1. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, thereafter separating said inorganic matter from said solution and finally removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

2. Method in accordance with claim 1 in which said solvent has a boiling point substantially between 35° and 150° C.

3. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content sufficient to substantially completely precipitate dispersed inorganic matter without appreciably dissolving the same, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

4. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content of from 3 to 8%, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

5. Method in accordance with claim 4 in which said solvent has a boiling point substantially between 35° and 150° C. and in which said moisture content is substantially maintained between 3 and 5%.

6. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution the pH between 3.0 to 7.0, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

7. Method in accordance with claim 6 in which said solvent has a boiling point substantially between 35° and 150° C. and in which said pH is substantially maintained between 3.5 and 4.

8. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a pH equivalent to methyl orange end point neutralization of a strong base with a strong acid, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

9. Method in accordance with claim 8 in which said solvent has a boiling point substantially between 35° and 150° C.

10. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content sufficient to substantially completely precipitate dispersed inorganic matter without appreciably dissolving the same and the pH between 3.0 to 7.0 separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

11. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content of from 3 to 8% and the pH between 3.0 to 7.0, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

12. Method in accordance with claim 11 in which said solvent has a boiling point substantially between 35° C. and 150° C. and in which said moisture content is substantially maintained between 3 and 5% and said pH is substantially maintained between 3.5 and 4.

13. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content of from 3 to 8% and a pH equivalent to methyl orange end point neutralization of a strong base with a strong acid, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

14. Method in accordance with claim 13 in which said solvent has a boiling point substantially between 35° and 150° C. and in which said moisture content is substantially maintained between 3 and 5%.

15. Method of purifying petroleum mahogany sulphonates which comprises contacting crude mahogany sulphonates containing inorganic matter and alkali with a substantially water immiscible organic solvent thereby forming a solution of mahogany sulphonate in said solvent and a remainder of undissolved inorganic matter, thereafter adjusting the moisture content of said solution to from 3 to 5% and subsequently neutralizing the solution with sulphuric acid to the methyl orange end point and finally separating undissolved inorganic matter from said solution and removing the solvent by distillation, said solvent being substantially incapable of dissolving inorganic salts and having a boiling point substantially between 35° and 150° C.

GEORGE ANDREAS KESSLER.
MANUEL BLUMER.

CERTIFICATE OF CORRECTION.

Patent No. 2,140,263. December 13, 1938.

GEORGE ANDREAS KESSLER, ET AL.

It is hereby certified that error appears in the printed specification of the above numbered patent requiring correction as follows: Page 3, second column, lines 18 and 64, and page 4, first column, line 6-7, claims 6, 10 and 11 respectively, for "3.0 to 7.0" read 3.0 and 7.0; and that the said Letters Patent should be read with this correction therein that the same may conform to the record of the case in the Patent Office.

Signed and sealed this 14th day of February, A. D. 1939.

Henry Van Arsdale.

(Seal)

Acting Commissioner of Patents.

matter with a substantially water immiscible organic solvent thereby forming a solution of mahogany sulphonate in said solvent and a remainder of undissolved inorganic matter, substantially maintaining in said solution a moisture content of from 3 to 8% and the pH between 3.0 to 7.0, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

12. Method in accordance with claim 11 in which said solvent has a boiling point substantially between 35° C. and 150° C. and in which said moisture content is substantially maintained between 3 and 5% and said pH is substantially maintained between 3.5 and 4.

13. Method of purifying petroleum mahogany sulphonates which comprises contacting crude mahogany sulphonates containing inorganic matter with a substantially water immiscible organic solvent thereby forming a solution of mahogany sulphonate in said solvent and a remainder of undissolved inorganic matter, substantially maintaining in said solution a moisture content of from 3 to 8% and a pH equivalent to methyl orange end point neutralization of a strong base with a strong acid, separating said inorganic matter from said solution and thereafter removing the solvent from the solution of the mahogany sulphonate, said solvent being substantially incapable of dissolving inorganic salts, liquid at ordinary temperatures and possessing a boiling point sufficiently low to permit its removal without substantial decomposition of mahogany sulphonate dissolved therein.

14. Method in accordance with claim 13 in which said solvent has a boiling point substantially between 35° and 150° C. and in which said moisture content is substantially maintained between 3 and 5%.

15. Method of purifying petroleum mahogany sulphonates which comprises contacting crude mahogany sulphonates containing inorganic matter and alkali with a substantially water immiscible organic solvent thereby forming a solution of mahogany sulphonate in said solvent and a remainder of undissolved inorganic matter, thereafter adjusting the moisture content of said solution to from 3 to 5% and subsequently neutralizing the solution with sulphuric acid to the methyl orange end point and finally separating undissolved inorganic matter from said solution and removing the solvent by distillation, said solvent being substantially incapable of dissolving inorganic salts and having a boiling point substantially between 35° and 150° C.

GEORGE ANDREAS KESSLER.
MANUEL BLUMER.

CERTIFICATE OF CORRECTION.

Patent No. 2,140,263. December 13, 1938.

GEORGE ANDREAS KESSLER, ET AL.

It is hereby certified that error appears in the printed specification of the above numbered patent requiring correction as follows: Page 3, second column, lines 18 and 64, and page 4, first column, line 6-7, claims 6, 10 and 11 respectively, for "3.0 to 7.0" read 3.0 and 7.0; and that the said Letters Patent should be read with this correction therein that the same may conform to the record of the case in the Patent Office.

Signed and sealed this 14th day of February, A. D. 1939.

Henry Van Arsdale.

(Seal) Acting Commissioner of Patents.